United States Patent
Smith

(10) Patent No.: US 10,936,123 B1
(45) Date of Patent: Mar. 2, 2021

(54) TACTILE CONFIRMATION FOR TOUCH SCREEN SYSTEMS

(71) Applicant: GM GLOBAL TECHNOLOGY OPERATIONS LLC, Detroit, MI (US)

(72) Inventor: Michael J. Smith, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/580,475

(22) Filed: Sep. 24, 2019

(51) Int. Cl.
| | |
|---|---|
| *G06F 3/041* | (2006.01) |
| *G06F 3/044* | (2006.01) |
| *B60K 35/00* | (2006.01) |

(52) U.S. Cl.
CPC .......... *G06F 3/04186* (2019.05); *B60K 35/00* (2013.01); *G06F 3/044* (2013.01); *G06F 3/04142* (2019.05); *B60K 2370/158* (2019.05); *G06F 2203/04106* (2013.01)

(58) Field of Classification Search
CPC ....... G01L 1/142; G01L 19/0092; G01L 9/12; G06F 3/0414; G06F 3/044; G06F 2203/04106; G06F 2203/04107; H04M 1/026; H04M 1/0266; H04M 1/0277; H04M 2250/12; H04M 2250/22
See application file for complete search history.

(56) References Cited

U.S. PATENT DOCUMENTS

| | | | |
|---|---|---|---|
| 2016/0195932 A1* | 7/2016 | Czelnik | ................ G06F 3/0414 715/702 |
| 2018/0059823 A1* | 3/2018 | Chang | ................... G06F 3/0416 |
| 2020/0064952 A1* | 2/2020 | Gupta | ................ H04M 1/0277 |

* cited by examiner

*Primary Examiner* — Nelson M Rosario
(74) *Attorney, Agent, or Firm* — Lorenz & Kopf, LLP

(57) ABSTRACT

In accordance with an exemplary embodiment, a touch screen system is provided that includes a housing, a display screen, one or more capacitive sensors, and one or more force sensors. The display screen is mounted on the housing. The one or more capacitive sensors are coupled to the display screen, and are configured to generate capacitive sensing data pertaining to possible inputs from a user of the touch screen system. The one or more force sensors are configured to generate force sensing data pertaining to the possible inputs for use in confirming the possible inputs from the capacitive sensing data.

20 Claims, 6 Drawing Sheets

US 10,936,123 B1

TACTILE CONFIRMATION FOR TOUCH SCREEN SYSTEMS

TECHNICAL FIELD

The technical field generally relates to the field of touch screen systems and, more specifically, to confirmation of inputs for touch screen systems, such as for vehicles.

BACKGROUND

Many vehicles and other systems include one or more touch screen systems, for example for a user of the vehicle to provide inputs for controlling one or more vehicle functions. However, current systems may not always be optimal as far as confirming inputs for the touch screens.

Accordingly, it is desirable to provide touch screen systems, such as for vehicles, with an improved confirmation for inputs for the touch screen. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a touch screen system is provided that includes a housing, a display screen, one or more capacitive sensors, and one or more force sensors. The display screen is mounted on the housing. The one or more capacitive sensors are coupled to the display screen, and are configured to generate capacitive sensing data pertaining to possible inputs from a user of the touch screen system. The one or more force sensors are configured to generate force sensing data pertaining to the possible inputs for use in confirming the possible inputs from the capacitive sensing data.

Also in one embodiment, the one or more force sensors include two force sensors disposed on opposite corners of a bottom portion of the display screen.

Also in one embodiment, the one or more force sensors include four force sensors disposed on four respective corners of the display screen.

Also in one embodiment, the touch screen system further includes a processor coupled to the one or more capacitive sensors and the one or more force sensors and configured to confirm the possible inputs from the capacitive sensing data using the force sensing data.

Also in one embodiment, the processor is further configured to provide instructions to implement the possible inputs based on whether the possible inputs are confirmed using the capacitive sensing data.

Also in one embodiment, the processor is further configured to: determine a capacitive input location for the possible inputs based on the capacitive sensing data; determine a force input location for the possible inputs based on the force sensing data; and provide instructions to implement the possible inputs based on a proximity of the capacitive input location to the force input location.

Also in one embodiment, the processor is further configured to: determine whether the force input location corresponds to a center of gravity of the display screen, using the force sensing data; and provide instructions to implement the possible inputs based on whether the force input location corresponds to the center of gravity of the display screen.

In another exemplary embodiment, a vehicle is provided that includes a vehicle body, a drive system, and a touch screen system. The drive system is configured to move the vehicle body. The touch screen system is mounted on the vehicle body, and includes: a housing mounted on the vehicle body; a display screen mounted on the housing; one or more capacitive sensors coupled to the display screen and configured to generate capacitive sensing data pertaining to possible inputs from a user of the touch screen system; and one or more force sensors configured to generate force sensing data pertaining to the possible inputs for use in confirming the possible inputs from the capacitive sensing data.

Also in one embodiment, the one or more force sensors include two force sensors disposed on opposite corners of a bottom portion of the display screen.

Also in one embodiment, the one or more force sensors include four force sensors disposed on four respective corners of the display screen.

Also in one embodiment, the vehicle further includes a hinge mounting the touch screen system to the vehicle body.

Also in one embodiment, the vehicle further includes a processor coupled to the one or more capacitive sensors and the one or more force sensors and configured to confirm the possible inputs from the capacitive sensing data using the force sensing data.

Also in one embodiment: the user inputs pertain to operation of one or more vehicle functions for the vehicle; and the processor is further configured to provide instructions to implement the possible inputs for the operation of the one or more vehicle functions based on whether the possible inputs are confirmed using the capacitive sensing data.

Also in one embodiment, the processor is further configured to: determine a capacitive input location for the possible inputs based on the capacitive sensing data; determine a force input location for the possible inputs based on the force sensing data; and provide instructions to implement the possible inputs for the operation of the one or more vehicle functions based on a proximity of the capacitive input location to the force input location.

Also in one embodiment, the processor is further configured to: determine whether the force input location corresponds to a center of gravity of the display screen, using the force sensing data; and provide instructions to implement the possible inputs for the operation of the one or more vehicle functions based on whether the force input location corresponds to the center of gravity of the display screen.

In another exemplary embodiment, a method is provided that includes: receiving capacitive sensing data from one or more capacitive sensors coupled to a display screen of a touch screen system, the capacitive sensing data pertaining to possible inputs from a user of the touch screen system; receiving force sensing data from one or more force sensors coupled to the display screen of the touch screen system, the force sensing data pertaining to the possible inputs from the user of the touch screen system; and confirming, via a processor, the possible inputs from the capacitive sensing data using the force sensing data.

Also in one embodiment, the method further includes: determining, via the processor, a capacitive input location for the possible inputs based on the capacitive sensing data; determining, via the processor, a force input location for the possible inputs based on the force sensing data; and providing, via the processor, instructions to implement the possible inputs based on a proximity of the capacitive input location to the force input location.

Also in one embodiment, the method further includes: determining, via the processor, a capacitive input location for the possible inputs based on the capacitive sensing data; determining, via the processor, a force input location for the possible inputs based on the force sensing data; and providing, via the processor, instructions to implement the possible inputs based on a proximity of the capacitive input location to the force input location.

Also in one embodiment, the method further includes: determining, via the processor, whether the force input location corresponds to a center of gravity of the display screen, using the force sensing data; and providing, via the processor, instructions to implement the possible inputs based on whether the force input location corresponds to the center of gravity of the display screen.

Also in one embodiment: the user inputs pertain to operation of one or more vehicle functions for a vehicle; and the processor is further configured to provide instructions to implement the possible inputs for the operation of the one or more vehicle functions based on whether the possible inputs are confirmed using the capacitive sensing data.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
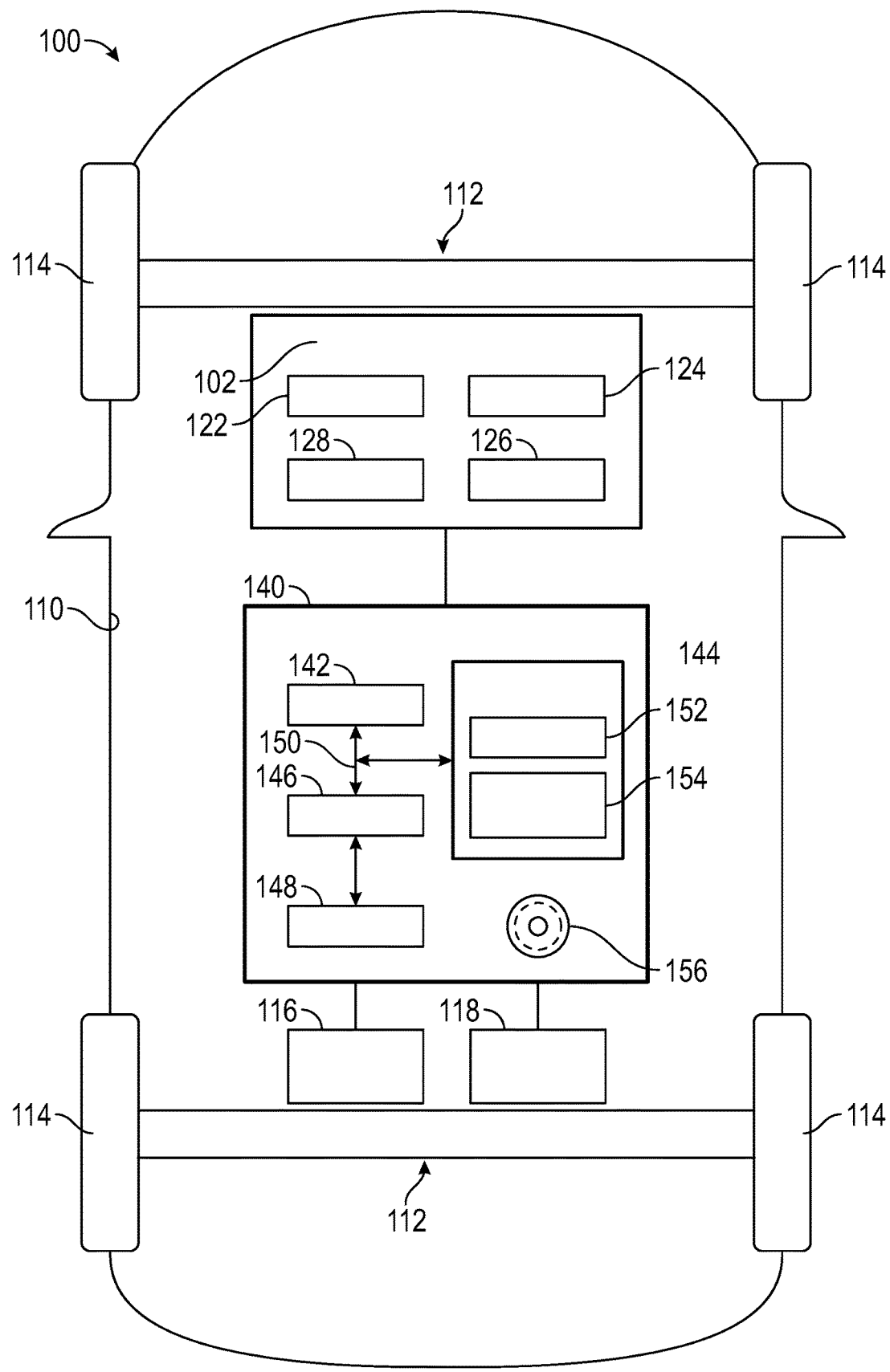
FIG. 1 is a functional block diagram of a vehicle that includes a touch screen system that includes capacitive sensors as well as force sensors that provide confirmation of user inputs, in accordance with an exemplary embodiment.

FIG. 1 illustrates a vehicle 100, according to an exemplary embodiment. As described in greater detail further below, the vehicle 100 includes a touch screen system 102. In various embodiments, the vehicle 100 may include more than one touch screen systems 102. Also in various embodiments, the touch screen system(s) 102 may be mounted on the vehicle 100 at any number of different locations, for example on a front dash or panel, a front infotainment unit, a rear infotainment unit, and/or any number of different locations.

As depicted in FIG. 1, in various embodiments, each touch screen system 102 includes a housing 122, a display screen 124, capacitive sensors 126, and force sensors 128. In various embodiments, the housing 122 is mounted on a body 110 of the vehicle 100. Also in various embodiments, the display screen 124 is mounted on the housing 122. In certain embodiments, the display screen 124 comprises a light emitting diode (LED) display screen; however, this may vary in other embodiments. In addition, in various embodiments, the force sensors 128 comprise strain gauge sensors; however, this may also vary in other embodiments.

While the force sensors 128 are depicted as being part of the touch screen 102, it will be appreciated that this may vary in certain embodiments. For example, in certain embodiments, the force sensors 128 are read by the computer system 140.

Various embodiments and implementations of the touch screen system 102 are depicted in FIGS. 2, 3, 5, and 6 and described further below in connection therewith, as well as in connection with a process for confirming user inputs for the touch screen system 102 as set forth in the flowchart of FIG. 4. As noted below, the various touch screen systems 102 may be utilized in connection with vehicles (such as the vehicle 100) and/or separate from a vehicle, in various different embodiments.

In certain embodiments, as depicted in FIG. 1, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle, an airplane, a marine vehicle, and/or one or more other types of vehicles.

In the depicted embodiment, the vehicle 100 includes the above-referenced body 110 that substantially encloses other components of the vehicle 100. Also in the depicted embodiment, the vehicle 100 includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in various embodiments, the touch screen system 102 is coupled to a computer system 140. In various embodiments, the computer system 140 controls operation of the touch screen system 102 and provides confirmation of user inputs for the touch screen systems 102 based on determinations made from data obtained from the capacitive sensors 126 and the force sensors 128. In various embodiments, the computer system 140 also controls various different vehicle systems, such as the drive system 116 and/or one or more other systems 118, based on the user inputs for the touch screen system 102 and the confirmation thereof. In certain embodiments, the other systems 118 include one or more safety systems and/or vehicle operational systems that control vehicle functionality such as a lighting system, defrost system, gear shifting system, vehicle start/stop system, vehicle start button, air conditioning, infotainment, and/or any number of other different vehicle systems, each of which may be controlled by the computer system 140 based on the user inputs for the touch screen system 102 and the confirmation thereof by the computer system 140. In various embodiments, the computer system 140 performs these functions in accordance with the process 400 described below in connection with FIG. 4.

In the depicted embodiment, the computer system 140 includes a processor 142, a memory 144, an interface 146, a storage device 148, and a bus 150. The processor 142 performs the computation and control functions of the computer system 140 and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the computer system 140 and the computer system of the computer system 140, generally in executing the processes described herein, such as the process 400 described below in connection with FIG. 4.

The memory 144 can be any type of suitable memory. For example, the memory 144 may include various types of dynamic random-access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154.

The bus 150 serves to transmit programs, data, status and other information or signals between the various components of the computer system of the computer system 140. The interface 146 allows communication to the computer system of the computer system 140, for example from a system driver and/or another computer system, and can be implemented using any suitable method and apparatus. In one embodiment, the interface 146 obtains the various data from the touch screen display 102 (e.g., from the capacitive sensors 126 and the force sensors 128 thereof). The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes of the present disclosure, such as the steps of the process 400 (and any sub-processes thereof) described in connection with FIG. 4. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the computer system 140 may also otherwise differ from the embodiment depicted in FIG. 1, for example in that the computer system of the computer system 140 may be coupled to or may otherwise utilize one or more remote computer systems and/or other control systems.

In addition, it will be appreciated that while the screen display system 102 is described herein in connection with a vehicle in accordance with certain embodiments, that the display system 102 of FIG. 1 (and as depicted and/or described in connection with FIGS. 2-6) may also be implemented in various other contexts, separate and apart from a vehicle such as in connection with a computer screen (e.g., a screen for a desktop, laptop, notebook, and/or other computer), a smart phone screen, a television screen, a video game screen, a kiosk, and/or one or more screens used in connection with any number of other different types of electronic devices and/or systems.

Figure 2:
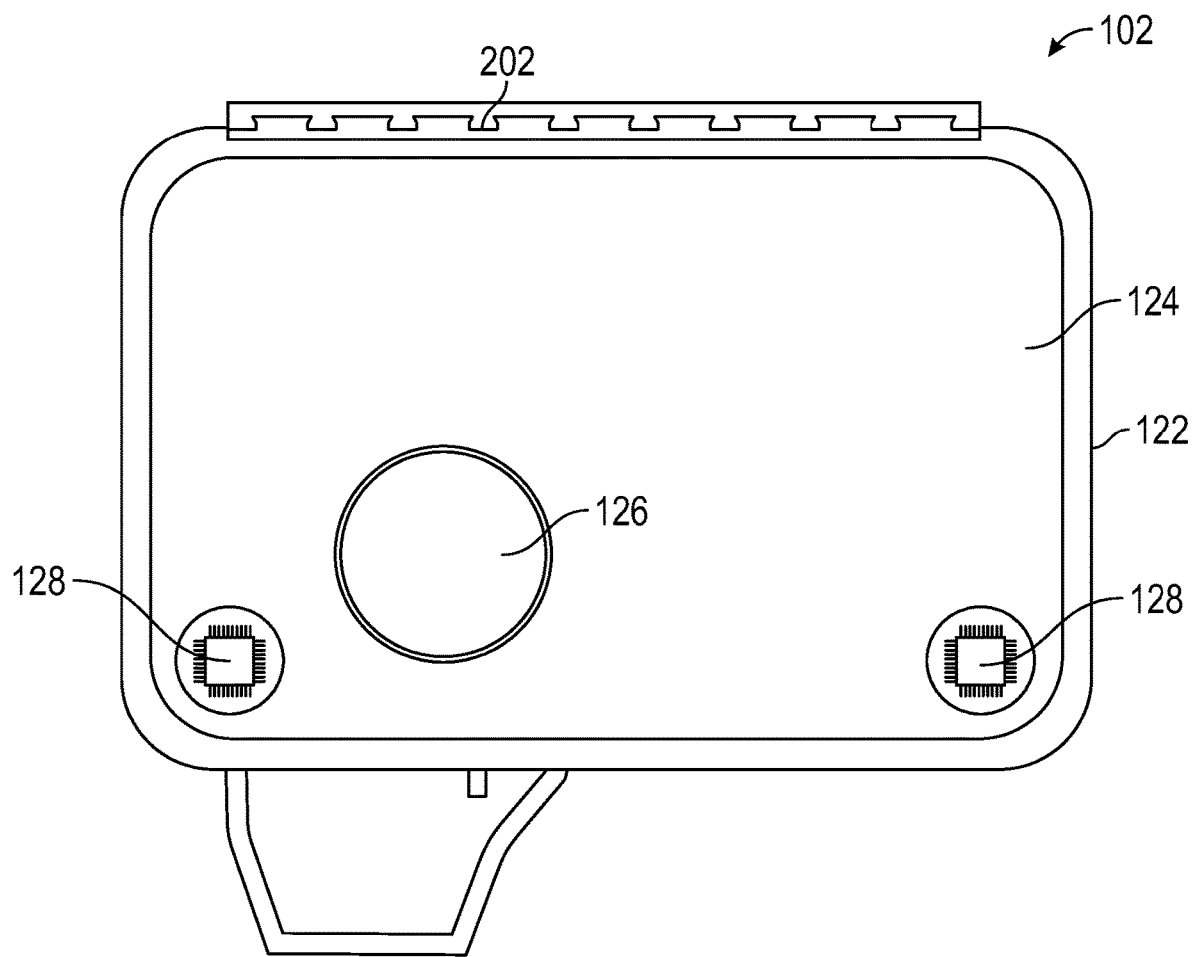
FIG. 2 is a schematic diagram of an exemplary touch screen system of FIG. 1, depicted with two force sensors and a hinge, in accordance with an exemplary embodiment.
Figure 3:
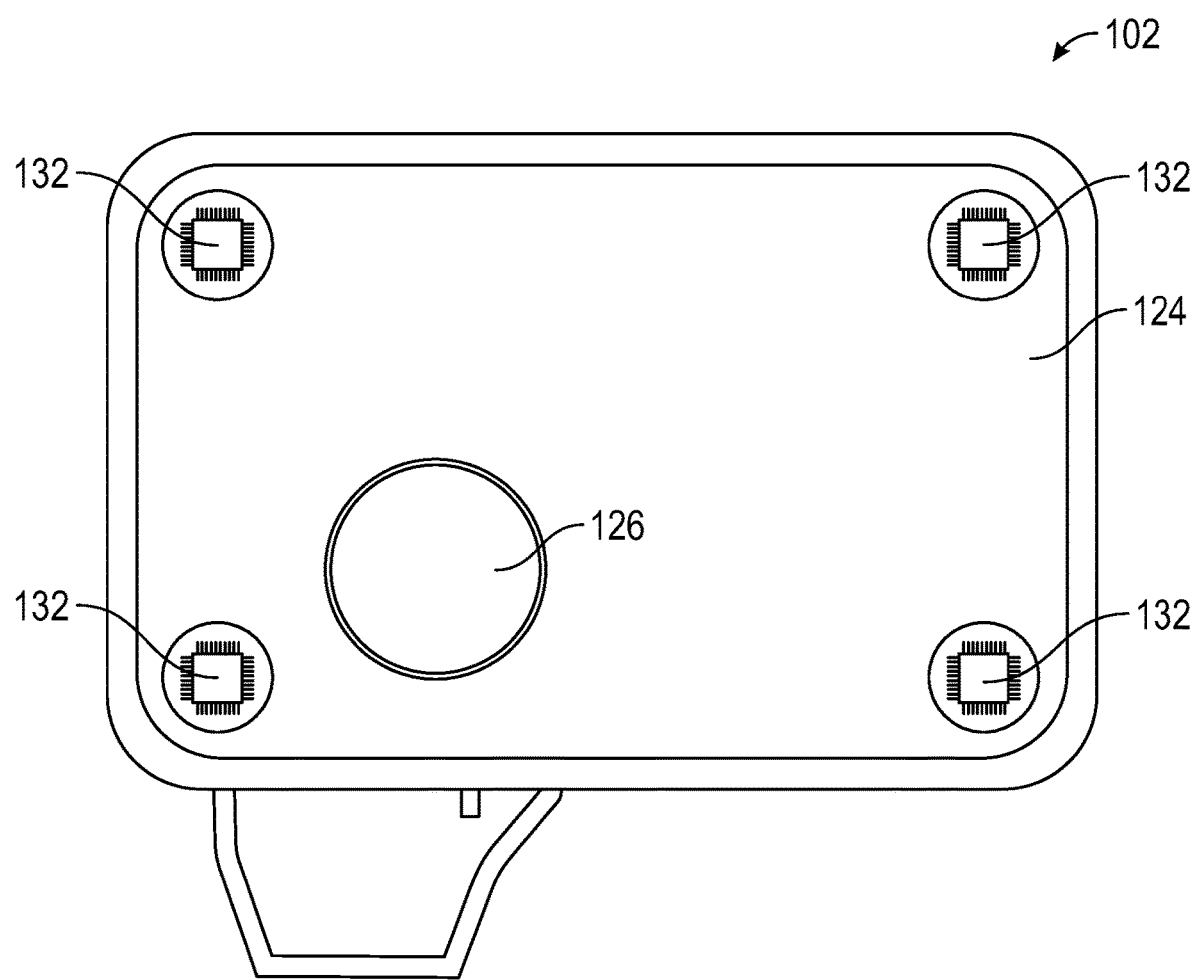
FIG. 3 is a schematic diagram of an exemplary touch screen system of FIG. 1, depicted with four force sensors, in accordance with an exemplary embodiment.

FIGS. 2 and 3 are schematic diagrams of exemplary touch screen systems 102 of FIG. 1, in different exemplary embodiments.

First, FIG. 2 depicts the touch screen system 102 with two force sensors 128, in accordance with one exemplary embodiment. As depicted in FIG. 2, in this embodiment, the two force sensors 128 are disposed along a bottom portion of the display screen 124, on opposing ends (i.e., corners) of the bottom portion of the display screen 124. However, this may vary in other embodiments, for example in that the force sensors 128 may be mounted in any number of other locations. It will also be appreciated that the number of force sensors 128 may vary, and for example that any number of force sensors 128 may be included. In addition, in the embodiment of FIG. 2. A hinge 202 is depicted for mounting the touch screen system 102 to the vehicle 100.

Next, FIG. 3 depicts the touch screen system 102 with four force sensors 128, in accordance with another exemplary embodiment. As depicted in FIG. 3, in this embodiment, two force sensors 128 are disposed along a bottom portion of the display screen 124, on opposing sides of the bottom portion of the display screen 124, similar to the embodiment of FIG. 2. In addition, also as depicted in FIG. 3, in this embodiment the touch screen system 102 also includes two additional force sensors 128 that are vertically aligned with the bottom two force sensors 128, such that the four force sensors 128 are disposed on respective corners of the display screen 124. However, this may vary in other embodiments, for example in that the force sensors 128 may be mounted in any number of other locations. It will also be appreciated that the number of force sensors 128 may vary, and for example that any number of force sensors 128 may be included. The embodiment of FIG. 3 is depicted without a hinge.

It will be appreciated that the number of force sensors 128 may vary in different embodiments, although the embodiments with two force sensors 128 (as depicted in FIG. 2) and with four force sensors (as depicted in FIG. 3) represent two preferred embodiments for implanting the process 400 of FIG. 4 described below. In addition, it will also be appreciated that in certain embodiments a hinge 202 may also be used for certain implementations of the embodiment of FIG. 3, and/or that in certain embodiments a hinge 202 may not be needed for certain implementations of the embodiment of FIG. 2, and so on.

In the embodiments of FIGS. 2 and 3, the force sensors 128 are configured to provide sensor data used for confirming inputs that a user has provided via the capacitive sensors 126, via the computer system 140 of FIG. 1 in implementing the process 400 of FIG. 4 (described below).

Figure 4:
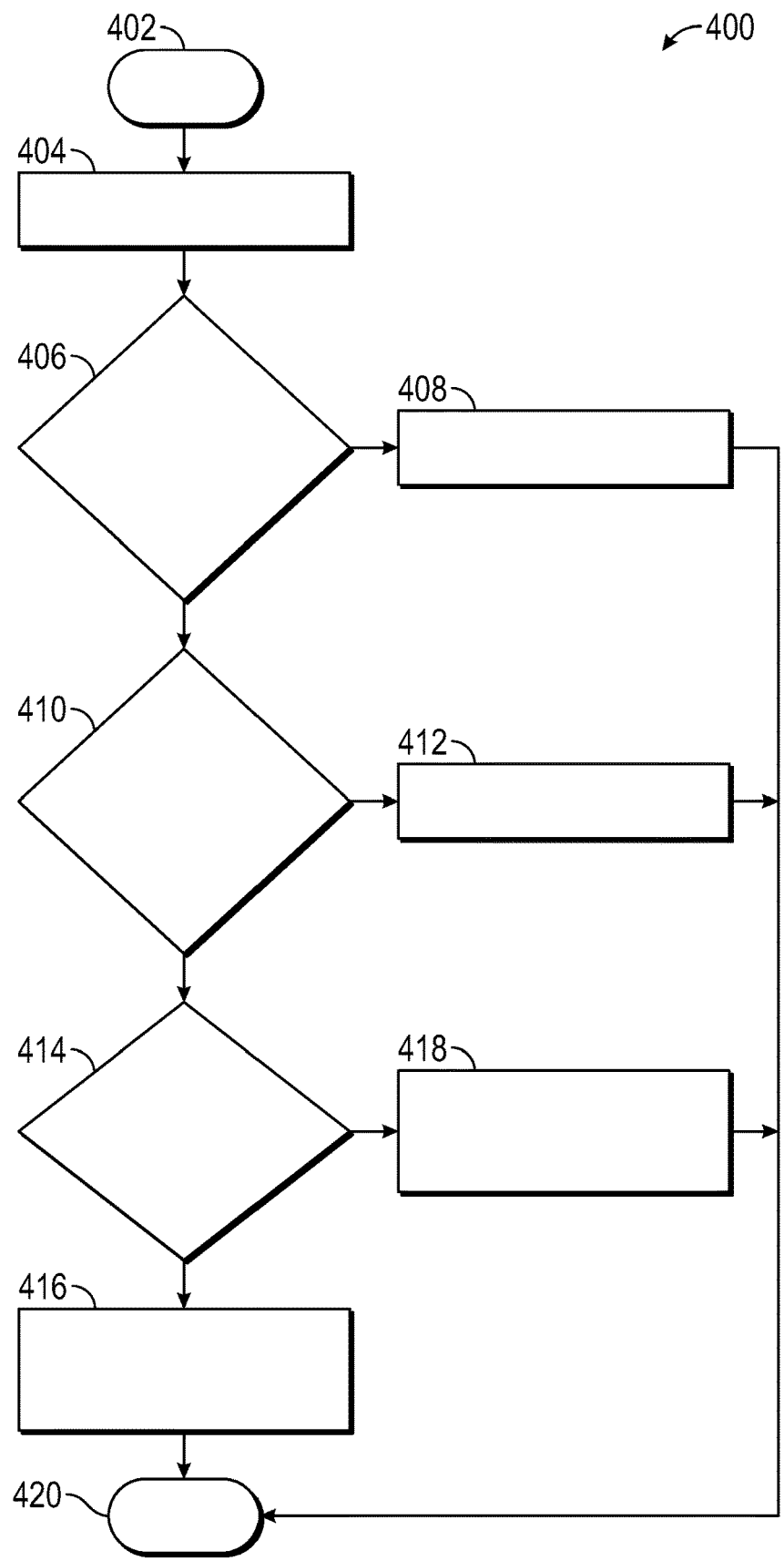
FIG. 4 is a flowchart of a processor for confirming user inputs for a touch screen system, and that can be implemented in connection with the vehicle of FIG. 1 and the touch screen systems of FIGS. 1-3, in accordance with an exemplary embodiment.

FIG. 4 is a flowchart of a process 400 for confirming user inputs for a touch screen system, in accordance with an exemplary embodiment. In various embodiments, the process 400 may be implemented in connection with the vehicle of FIG. 1 and the touch screen systems of FIGS. 1-3, along with the implementations of FIGS. 5 and 6 (described further below), in accordance with exemplary embodiments.

As depicted in FIG. 4, the process 400 begins at 402. In certain embodiments, the process 400 begins when a user approaches or contacts a touch screen system (such as the touch screen system 102 of FIGS. 1-3), and/or when a vehicle and/or other system with the touch screen system 102 is turned on or operational (e.g., in the case of a vehicle such as the vehicle 100 of FIG. 1, when the vehicle 100 is turned on and/or when a user enters the vehicle 100, in certain embodiments).

A possible user input is detected at 404. In various embodiments, the possible user input is detected by the capacitive sensors 126 of FIGS. 1-3 when the user contacts the display screen 124 of FIGS. 1-3, based on capacitive sensing data obtained from the capacitive sensors 126. In certain embodiments, the processor 142 of FIG. 1 processes values pertaining to the capacitive sensors 126 and/or stores such values in the memory 144 of FIG. 1 as stored values thereof.

In addition, a determination is made at 406 as to whether additional pressure is detected. In various embodiments, the processor 142 of FIG. 1 makes this determination based on whether the force sensors 128 of FIG. 1 detect any additional pressure on the display screen 124 in relation to the possible user input, as reflected in force sensing data obtained by the force sensors 128 of FIGS. 1-3. Accordingly, in various embodiments, the force sensing data from the force sensors 128 is used to confirm the possible inputs as detected from the capacitive sensing data from the capacitive sensors 126. In various embodiments, the force sensing data provided by the force sensors 128 is stored in the memory 144 of FIG. 1 as stored values thereof.

In various embodiments, if it is determined at 406 that the force sensors 128 do not detect additional pressure (i.e., that the possible user inputs from the capacitive sensing data are not confirmed by the force sensing data), then the possible user input of step 404 is ignored at step 408. Specifically, in various embodiments, the capacitive sensing data of step 404 is determined to not be confirmed as a true user input by the force sensors 128, and therefore the possible user input from the capacitive sensing data is ignored at step 408 for the purposes of the operation of the drive system 116 and other vehicle systems 118 of FIG. 1. In certain embodiments, the process then terminates at step 420, for example, until a new input is detected in a new iteration of step 404.

Conversely, if it is instead determined at 406 that the force sensors 128 do detect additional pressure (i.e., that the possible user inputs from the capacitive sensing data are confirmed by the force sensing data), then in certain embodiments a further determination at step 410 as to whether the detected force is acting through the center of gravity of the display screen 124. Specifically, in certain embodiments, the processor 142 of FIG. 1 makes this determination based on a detected origin of the pressure from the force sensing data obtained from the force sensors 128 by the processor 142, for example using a triangulation technique and comparing the resulting value with a known center of gravity for the display screen 124 as a stored value 154 of the memory 144 of FIG. 1.

In certain embodiments, if it is determined at 410 that the detected force is acting through the center of gravity of the display screen 124, then the possible user input of step 404 is ignored at step 412. Specifically, in various embodiments, the sensed input data is determined to be caused by outside vibrations (e.g., for a road on which the vehicle 100 is travelling) instead of a true user input for the touch screen system 102, and therefore the possible user input is ignored at step 412 (similar to step 408, described above) for the purposes of the operation of the drive system 116 and other vehicle systems 118 of FIG. 1. In certain embodiments, the process then terminates at step 420, for example, until a new input is detected in a new iteration of step 404.

Conversely, in certain embodiments, if it is instead determined at 410 that the detected force is not acting through the center of gravity of the display screen 124, then an additional determination is made at step 414 as to whether the possible inputs are detected at a similar screen location. Specifically, in various embodiments, the processor 142 examines the force sensing data of step 406, uses one or more triangulation techniques to determine one or more force input locations on the display screen 124 on which the force inputs are likely to have originated, and compares these one or more force input locations of the user input with one or more capacitive input locations of the user input from the capacitive sensors 126. As noted below, in various embodiments, the user's instructions from the user input are selectively followed based on a proximity of the capacitive input location(s) to the force input location(s). Also in various embodiments, the possible inputs are determined to be detected at a similar screen location if the determined location of the force inputs are within a predetermined distance of the determined location of the capacitive inputs.

Figure 5:
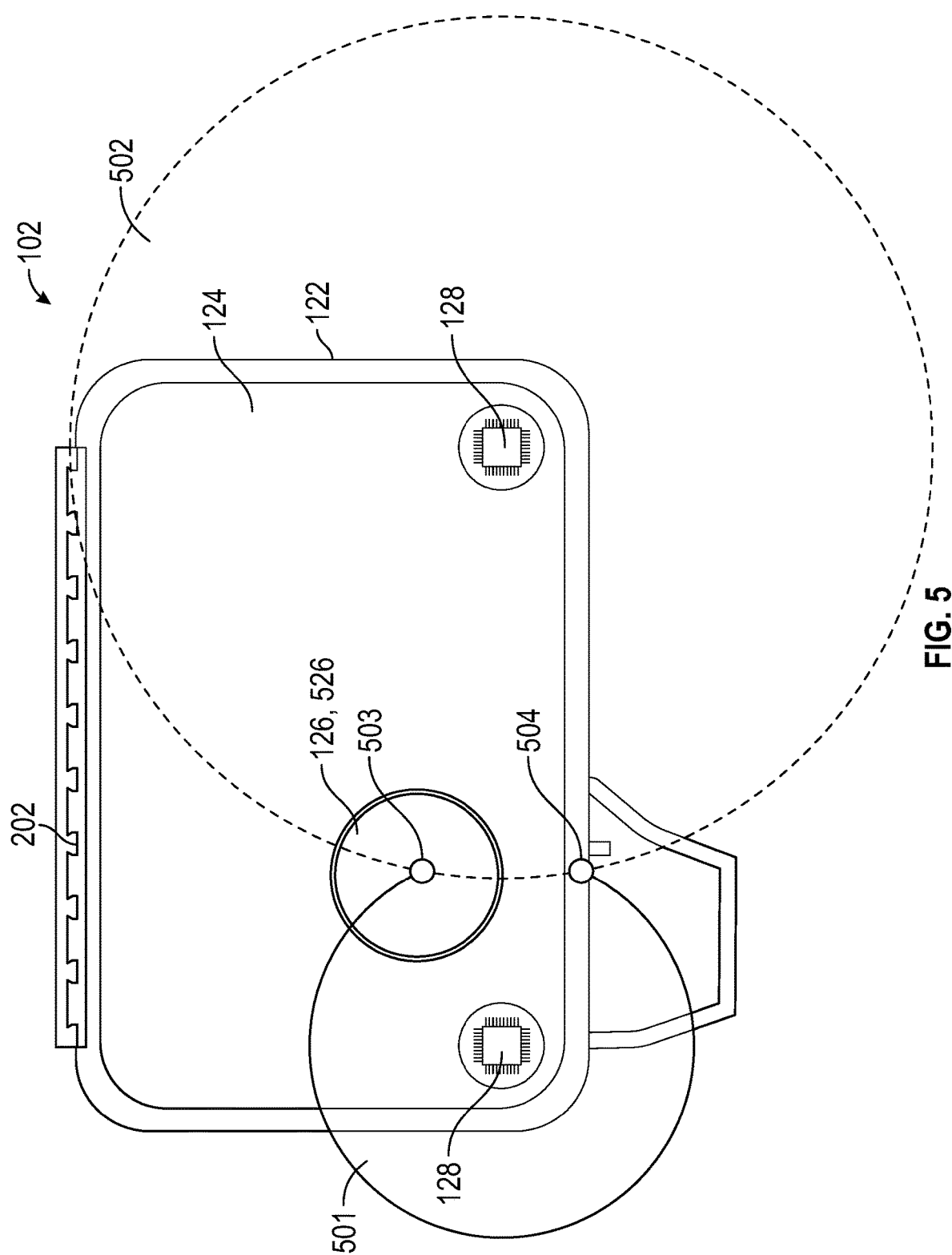
FIG. 5 is a schematic diagram of the touch screen system of FIG. 2, depicted with a respective region of detection for each of the force sensors, in accordance with an exemplary embodiment.
Figure 6:
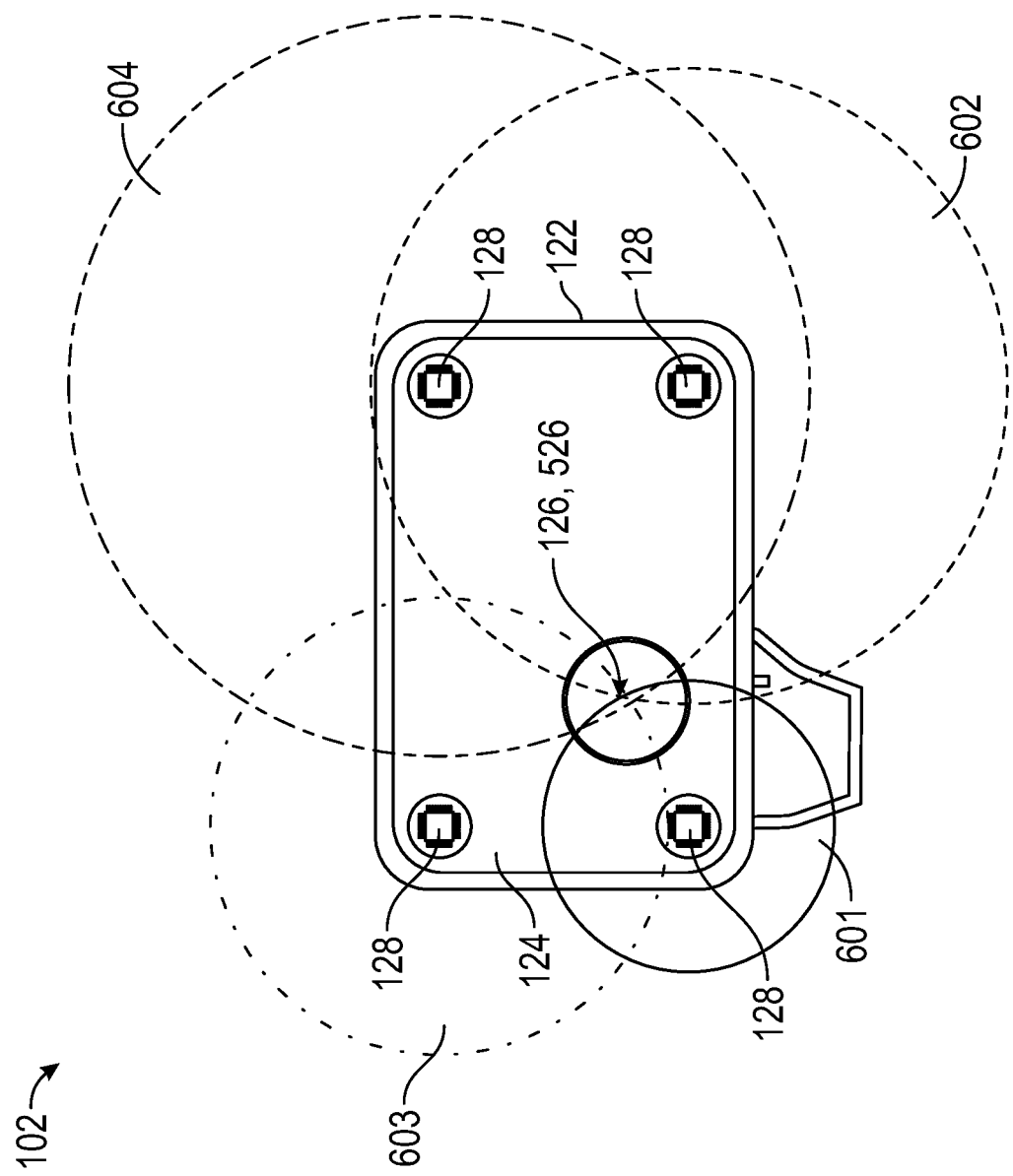
FIG. 6 is a schematic diagram of the touch screen system of FIG. 3, depicted with a respective region of detection for each of the force sensors, in accordance with an exemplary embodiment.

Specifically, with reference to FIGS. 5 and 6, different circular regions are depicted with respect to the location of the force inputs, for use in the determination of step 414, in accordance with certain exemplary embodiments. For example, in the embodiment of FIG. 5 with two force sensors 128, there are depicted two different circular regions 501, 502 for the location of the force inputs, one for each of the respective force sensors. The circular regions 501, 502 intersect with two potential force input location points 503, 504. As shown in FIG. 5, due to the configuration of this exemplary embodiment of the touch screen system 102 (from FIG. 2), a first potential force input location 503 coincides with a capacitive input location point 526 (and would thus be utilized, in one embodiment), while a second force input location 504 would be off the display screen 124 (and would thus be disregarded, in one embodiment). Similar, by way of additional example, in the embodiment of FIG. 6 with four force sensors 128, there are depicted four different circular regions 501, 502, 503, and 504 for the location of the force inputs, one for each of the respective force sensors.

With reference back to FIG. 4, if it is determined at 414 that the possible capacitive inputs and the detected force inputs are located within a similar region of the display screen 124 (i.e., that the force input location(s) and the capacitive input location(s) are within proximity to one another, within a predetermined distance from one another), then the process proceeds to step 416. During step 416, functionality is provided corresponding to the input request from the user. For example, in a vehicle implementation according to FIG. 1, in various embodiments, the processor 142 of FIG. 1 provides instructions for the requested vehicle functionality corresponding to the user request, for vehicle operations such as for the drive system 116 and/or one or more of the other systems 118 of the vehicle 100, such as, by way of example, one or more safety systems and/or vehicle operational systems that control vehicle functionality such as a lighting system, defrost system, gear shifting system, vehicle start/stop system, vehicle start button, air conditioning, infotainment, and/or any number of other different vehicle systems. In certain embodiments, the process then terminates at step 420, for example, until a new input is detected in a new iteration of step 404.

Conversely, if it is determined at 414 that the possible capacitive inputs and the detected force inputs are not located within a similar region of the display screen 124 (i.e., not within proximity to one another, and not within a predetermined distance from one another), then the process proceeds instead to step 418. During step 418, the then the possible user input of step 404 is ignored at step 412. Specifically, in various embodiments, the possible user input is ignored at step 418 (similar to steps 408 and 412, described above) for the purposes of the operation of the drive system 116 and other vehicle systems 118 of FIG. 1. Also in certain embodiments, during step 418, a transition is provided to put touch screen system 102 (and, in certain embodiments, one or more other vehicle systems) in a failsafe mode (e.g., in accordance with instructions provided by the processor 142 of FIG. 1). In certain embodiments, the process then terminates at step 420, for example, until a new input is detected in a new iteration of step 404.

Accordingly, in various embodiments, a touch screen system is provided, along with an associated computer system, that provides for confirmation of user inputs for the touch screen system, using both capacitive sensors and force sensors in combination with one another. In various embodiments, this is performed via the systems, vehicles, and methods disclosed herein. In addition, it will be appreciated that in various embodiments the disclosed systems, vehicles, and methods may provide for improved interpretation and implementation of user inputs, while correctly ignoring data that is not representative of true user inputs. In addition, the disclosed systems, vehicles, and methods may also similarly be useful in providing error detection for the touch screen system and/or other associated systems.

It will be appreciated that the systems, vehicles, applications, and implementations may vary from those depicted in the Figures and described herein. For example, in various embodiments, the touch screen systems 102 of FIGS. 1-3, 5, and 6, the vehicle 100 of FIG. 1, and/or systems and/or components thereof, may vary in different embodiments. In addition, also in various embodiments, the process 400 of FIG. 4 and/or sub-processes and/or components thereof may also vary in different embodiments, among other possible variations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A touch screen system comprising:
 a housing;
 a display screen mounted on the housing;
 one or more capacitive sensors coupled to the display screen and configured to generate capacitive sensing data pertaining to possible inputs from a user of the touch screen system;
 one or more force sensors configured to generate force sensing data pertaining to the possible inputs for use in confirming the possible inputs from the capacitive sensing data; and
 a processor coupled to the one or more capacitive sensors and the one or more force sensors and configured to:
  determine a capacitive input location for the possible inputs based on the capacitive sensing data;
  determine a force input location for the possible inputs based on the force sensing data;
  determine whether a detected force that is detected via the one more force sensors is acting through a center of gravity of the display screen based on the force input location;
  when the detected force is acting through a center of gravity of the display screen, then provide instructions to ignore the possible inputs; and
  when the detected force is not acting through the center of gravity of the display screen, then:
   determine a distance between the capacitive input location and the force input location;
   when the distance is greater than a predetermined threshold, then provide instructions to ignore the possible inputs; and
   when the distance is not greater than the predetermined threshold, then provide instructions to implement the possible inputs.

2. The touch screen system of claim 1, wherein the one or more force sensors comprise two force sensors disposed on opposite corners of a bottom portion of the display screen.

3. The touch screen system of claim 1, wherein the one or more force sensors comprise four force sensors disposed on four respective corners of the display screen.

4. The touch screen system of claim 1, wherein the processor is configured to determine whether the detected force that is detected via the one more force sensors is acting through the center of gravity of the display screen based on the force input location using a triangulation technique and comparing the resulting value with a known center of gravity for the display screen that has been stored in a computer memory.

5. The touch screen system of claim 1, wherein the processor is configured to determine the force input location using a plurality of circular regions corresponding to different force censors, and based on which of the plurality of circular regions coincides with a capacitive input location point.

6. The touch screen system of claim 5, wherein the processor is configured to provide instructions for implementing of the user inputs based on whether one of the plurality of circular regions is within the predetermined distance of the capacitive input location point.

7. The touch screen system of claim 6, wherein the processor is configured to provide instructions for implementing of the user inputs if, and only if, both of the following conditions are satisfied, namely, that:
  (i) the detected force is not acting through the center of gravity of the display screen; and
  (ii) one of the plurality of circular regions is within the predetermined distance of the capacitive input location point.

8. A vehicle comprising:
a vehicle body;
a drive system configured to move the vehicle body; and
a touch screen system mounted on the vehicle body, the touch screen system comprising:
  a housing mounted on the vehicle body;
  a display screen mounted on the housing;
  one or more capacitive sensors coupled to the display screen and configured to generate capacitive sensing data pertaining to possible inputs from a user of the touch screen system;
  one or more force sensors configured to generate force sensing data pertaining to the possible inputs for use in confirming the possible inputs from the capacitive sensing data; and
  a processor coupled to the one or more capacitive sensors and the one or more force sensors and configured to:
    determine a capacitive input location for the possible inputs based on the capacitive sensing data;
    determine a force input location for the possible inputs based on the force sensing data;
    determine whether a detected force that is detected via the one more force sensors is acting through a center of gravity of the display screen based on the force input location;
    when the detected force is acting through a center of gravity of the display screen, then provide instructions to ignore the possible inputs; and
    when the detected force is not acting through the center of gravity of the display screen, then:
      determine a distance between the capacitive input location and the force input location;
      when the distance is greater than a predetermined threshold, then provide instructions to ignore the possible inputs; and
      when the distance is not greater than the predetermined threshold, then provide instructions to implement the possible inputs.

9. The vehicle of claim 8, wherein the one or more force sensors comprise two force sensors disposed on opposite corners of a bottom portion of the display screen.

10. The vehicle of claim 8, wherein the one or more force sensors comprise four force sensors disposed on four respective corners of the display screen.

11. The vehicle of claim 8, further comprising:
a hinge mounting the touch screen system to the vehicle body.

12. The vehicle of claim 8, wherein the processor is configured to determine whether the detected force that is detected via the one more force sensors is acting through the center of gravity of the display screen based on the force input location using a triangulation technique and comparing the resulting value with a known center of gravity for the display screen that has been stored in a computer memory.

13. The vehicle of claim 8, wherein the processor is configured to determine the force input location using a plurality of circular regions corresponding to different force censors, and based on which of the plurality of circular regions coincides with a capacitive input location point.

14. The vehicle of claim 13, wherein the processor is configured to provide instructions for implementing of the user inputs based on whether one of the plurality of circular regions is within the predetermined distance of the capacitive input location point.

15. The vehicle of claim 14, wherein the processor is configured to provide instructions for implementing of the user inputs if, and only if, both of the following conditions are satisfied, namely, that:
  (i) the detected force is not acting through the center of gravity of the display screen; and
  (ii) one of the plurality of circular regions is within the predetermined distance of the capacitive input location point.

16. A method comprising:
receiving capacitive sensing data from one or more capacitive sensors coupled to a display screen of a touch screen system, the capacitive sensing data pertaining to possible inputs from a user of the touch screen system;
receiving force sensing data from one or more force sensors coupled to the display screen of the touch screen system, the force sensing data pertaining to the possible inputs from the user of the touch screen system;
determining, via a processor, a capacitive input location for the possible inputs based on the capacitive sensing data;
determining, via the processor, a force input location for the possible inputs based on the force sensing data;
determining, via the processor, whether a detected force that is detected via the one more force sensors is acting through a center of gravity of the display screen based on the force input location;
when the detected force is acting through a center of gravity of the display screen, then providing, via the processor, instructions to ignore the possible inputs; and
when the detected force is not acting through the center of gravity of the display screen, then, via the processor;

determining a distance between the capacitive input location and the force input location;

when the distance is greater than a predetermined threshold, then providing instructions to ignore the possible inputs; and when the distance is not greater than the predetermined threshold, then providing instructions to implement the possible inputs.

17. The method of claim 16, wherein:

the user inputs pertain to operation of one or more vehicle functions for a vehicle; and the processor is further configured to provide instructions to implement the possible inputs for the operation of the one or more vehicle functions when the possible inputs are implemented, but not when the possible inputs are ignored based on whether the possible inputs are confirmed using the capacitive sensing data.

18. The method of claim 16, step of determining whether the detected force is acting through the center of gravity comprises determining whether the detected force that is detected via the one more force sensors is acting through the center of gravity of the display screen based on the force input location using a triangulation technique and comparing the resulting value with a known center of gravity for the display screen that has been stored in a computer memory.

19. The method of claim 16, wherein the force input location is determined using a plurality of circular regions corresponding to different force censors, and based on which of the plurality of circular regions coincides with a capacitive input location point.

20. The method of claim 19, wherein:

the instructions are provided via the processor for implementing of the user inputs based on whether one of the plurality of circular regions is within the predetermined distance of the capacitive input location point, such that the instructions for implementing of the user inputs are provided by the processor if, and only if, both of the following conditions are satisfied, namely, that:

(i) the detected force is not acting through the center of gravity of the display screen; and (ii) one of the plurality of circular regions is within the predetermined distance of the capacitive input location point.

\* \* \* \* \*